3,318,872
(OPTIONALLY 17-ALKYLATED) - 17β - HYDROXY-5A - ANDROSTANO[2,3-d] - 2 - AMINOPYRIMIDINES AND ACYL DERIVATIVES THEREOF
Paul D. Klimstra, Northbrook, Ill., assignor to G. D. Searle & Co., Chicago, Ill., a corporation of Delaware
No Drawing. Filed Feb. 8, 1965, Ser. No. 431,170
9 Claims. (Cl. 260—239.5)

The present invention is concerned with novel pentacyclic steroidal derivatives wherein the added ring system is heterocyclic and, more particularly, with (optionally 17 - alkylated) - 17β - hydroxy - 5α - androstano-[2,3-d]-2-aminopyrimidines and acyl derivatives thereof represented by the following structural formula

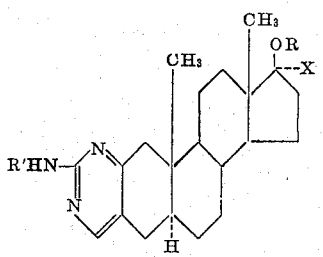

wherein R and R' can be either hydrogen or a lower alkanoyl radical, and X is hydrogen or a lower alkyl radical.

Examples of the lower alkyl radicals encompassed in the foregoing representation are methyl, ethyl, propyl, butyl, pentyl, hexyl, heptyl, and the branched-chain isomers thereof. The lower alkanoyl radicals depicted therein are typified by formyl, acetyl, propionyl, butyryl, valeryl, caproyl, heptanoyl, and the branched-chain groups isomeric therewith.

Equivalent to the instant amines for the purposes of this invention are the corresponding non-toxic acid-addition and quaternary salts as exemplified by the hydrochloride, hydrobromide, sulfate, nitrate, citrate, tartrate, maleate, gluconate, ascorbate, succinate, phosphate, lactate, benzoate, cinnamate, methosulfate, ethosulfate, methiodide, methochloride, and ethobromide.

Starting materials suitable for use in the manufacture of the compounds of the present invention are the 17-substituted 5α-androstan-2-ones represented by the following structural formula

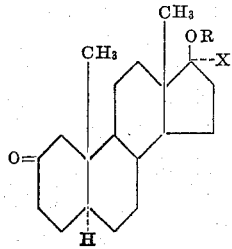

wherein R and X have the identical meanings as hereinbefore indicated. Condensation of those substances with an alkyl formate in the presence of a suitable alkaline catalyst results in the corresponding 3-hydroxymethylene derivatives. Typically, 17β-acetoxy-5α-androstan-2-one in benzene is contacted with ethyl formate in the presence of sodium hydride catalyst to produce 17β - hydroxy - 3 - hydroxymethylene - 5α - androstan-2-one. These intermediates are allowed to react with guanidine, preferably in the form of a salt such as the carbonate, in an inert solvent medium to yield the instant 17 - substituted 5α - androstano[2,3 - d] - 2 - amino-pyrimidines. A specific example is the reaction of 17β-hydroxy - 17α - methyl - 3 - hydroxymethylene - 5α - androstan-2-one with guanidine carbonate in ethanol at the reflux temperature of the mixture, thus producing the instant 17β - hydroxy - 17α - methyl - 5α - androstano [2,3-d]-2-amino-pyrimidines. Acylation of the 17β-hydroxy and 2'-amino functions of the instant compounds is effected by reaction with a lower alkanoic acid anhydride, preferably in the presence of an acid acceptor. For example, 17β - hydroxy - 5α - androstano[2,3-d]-2-aminopyrimidine hydrochloride is allowed to react with acetic anhydride in the presence of triethylamine at room temperature for about 18 hours to afford 17β-acetoxy-5α - androstano[2,3 - d] - 2-acetamidopyrimidine. When those diacylated derivatives are hydrolyzed under mild conditions, the corresponding 17-mono-(lower alkanoates) are produced. Reaction of the aforementioned 17β - acetoxy - 5α-androstano [2,3 - d] - 2 - acetamidopyrimidine with sodium carbonate in aqueous methanol at room temperature for 1-3 hours thus yields 17β-acetoxy-5α-androstano[2,3-d]-2-aminopyrimidine.

Preferential acylation of the 2'-amino function of the compounds of this invention is effected by reaction with the appropriate acid chloride, preferably in the presence of a suitable acid acceptor. The aforementioned 17β-hydroxy-5α-androstano[2,3,-d]-2-aminopyrimidine is thus contacted with acetyl chloride in pyridine to produce 17β - hydroxy - 5α - androstano[2,3 - d] - 2 - acetamidopyrimidine.

The compounds of the present invention are useful in view of their valuable antibiotic properties. They are anti-protozoal agents, for example, as is evidenced by their ability to inhibit the growth of such organisms as *Tetrahymena gelleii*. In addition, they exhibit valuable pharmacological properties. Thus, they are hormonal agents in consequence of their ability to induce the nitrogen-retaining effect characteristics of anabolic substances.

The compounds and methods of manufacture which constitute this invention will appear more fully from the examples which follow. In these examples quantities are given in parts by weight, unless otherwise noted, and temperatures in degrees centigrade (° C.).

*Example 1*

To a solution of one part of 17β-acetoxy-5α- androstan-2-one in 23 parts of benzene is added successively 1.7 parts of ethyl formate and 1.08 parts of a 51.5% sodium hydride suspension in mineral oil. The resulting reaction mixture is stirred vigorously in a nitrogen atmosphere for about 5½ hours, after which period of time 0.05 part of ethanol is added in order to initiate the reaction. Stirring is continued for about 5 hours longer, and the crude product is then collected by filtration, washed on the filter with benzene and hexane, and dried at reduced pressure over phosphorous pentoxide. The yellow solid material is purified further by slurrying with cold dilute hydrochloric acid, and the resulting cream-colored solid is collected by filtration, washed with water, and dried to produce 17β-hydroxy-3-hydroxymethylene-5α-androstan-2-one. This material displays infrared maxima, in chloroform, at about 2.75, 3.41, 6.1, and 6.34 microns and also an ultraviolet absorption maximum at about 275 millimicrons with a molecular extinction coefficient of about 11,900.

*Example 2*

A mixture of 17β-hydroxy-17α-methyl-5α-androstan-2-one with 70 parts of benzene is distilled slowly over a period of about 2 hours in order to remove moisture. To that mixture is then added, with rapid stirring, 3.5 parts of ethyl formate followed by 2 parts of a 56% sodium hydride mineral oil suspension. The reaction mixture is stirred under nitrogen for about 20 hours, then is filtered in order to separate the crude product.

The precipitate is washed on the filter with benzene and hexane, then is dried. Rapid stirring of that crude material with dilute hydrochloric acid for about 1½ hours affords a cream-colored crude product, which is isolated by filtration. Recrystallization from aqueous ethanol results in pure 17β-hydroxy-17α-methyl-3-hydroxymethylene-5α-androstan-2-one, melting at about 173.5–175° and characterized further by an ultraviolet absorption maximum at about 283 millimicrons with a molecular extinction coefficient of about 7500 and also by infrared absorption maxima, in chloroform, at about 2.75, 3.41, 6.1, and 6.34 microns.

*Example 3*

A mixture of 9 parts of 17β-hydroxy-3-hydroxy-methylene-5α-androstan-2-one and 2.8 parts of guanidine carbonate with 160 parts of ethanol is heated at the reflux temperature for about 23 hours, then is cooled and poured into a mixture of ice and water. The resulting aqueous mixture is allowed to stand at 0–5° for about one hour, then is filtered, and the solid material thus obtained is washed with water, then dried in air. Recrystallization of that crude product from acetonehexane results in pure 17β - hydroxy-5α-androstano[2,3-d]-2-aminopyrimidine, melting at about 219–221° with decomposition. This substance is further characterized by ultraviolet absorption maxima at about 230 and 304 millimicrons with molecular extinction coefficients of about 13,200 and 4,000 respectively. It is represented by the following structural formula

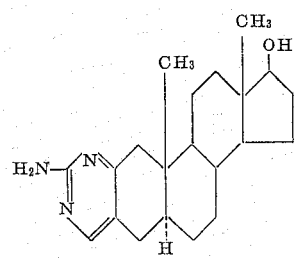

*Example 4*

A mixture of 2.5 parts of 17β-hydroxy-5α-androstano [2,3-d]-2-aminopyrimidine hydrochloride, 36.5 parts of triethylamine and 25 parts of acetic anhydride is allowed to stand at room temperature for about 18 hours, then is poured into a mixture of ice and water. The resulting precipitate is collected by filtration, dried in air, then recrystallized from aqueous methanol to afford pure 17β-acetoxy - 5α-androstano-[2,3-d]-2-acetamidopyrimidine, melting at about 108–111°. This compound can be represented by the following structural formula

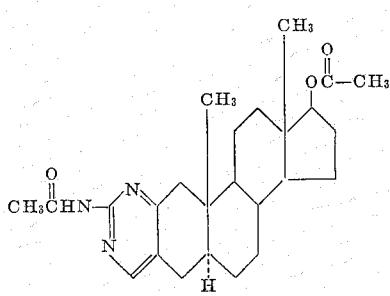

*Example 5*

By substituting an equivalent quantity of propionic anhydride and otherwise proceeding according to the processes described in Example 4, there is obtained 17β-propionoxy - 5α - androstano[2,3-d]-2-propionamidopyrimidine.

*Example 6*

The substitution of an equivalent quantity of 17β-hydroxy-17α-methyl - 5α - androstano[2,3-d]-2-aminopyrimidine in the procedure of Example 4 results in 17β-hydroxy-17α-methyl - 5α - androstano[2,3-d]-2-acetamidopyrimidine.

*Example 7*

A mixture of one part of 17β-acetoxy-5α-androstano [2,3-d]-2-acetamidopyrimidine, 0.5 part of sodium carbonate, 40 parts of methanol and 10 parts of water is allowed to stand at room temperature for about one hour, then is poured carefully into water. The resulting aqueous mixture is extracted with ether, and the ether layer is separated, dried over anhydrous potassium carbonate and stripped of solvent under reduced pressure to afford 17β-acetoxy-5α-androstano[2,3-d]-2-aminopyrimidine.

*Example 8*

To a solution of one part of 17β-hydroxy-5α-androstano[2,3-d]-2-aminopyrimidine in 10 parts of pyridine is added, at 0–5°, 5 parts of acetyl chloride. The resulting reaction mixture is kept at that temperature for about 3 minutes, then is poured carefully into a mixture of ice and water. Extraction of that aqueous mixture with ether affords an organic solution which is dried over anhydrous potassium carbonate, then stripped of solvent under reduced pressure to produce 17β-hydroxy-5α-androstano-[2,3-d]-2-acetamidopyrimidine.

*Example 9*

A mixture of 1.3 parts of 17β-hydroxy-17α-methyl-3-hydroxymethylene-5α-androstan-2-one, 0.4 part of guanidine carbonate and 28 parts of ethanol is heated at the reflux temperature for about 20 hours, then is poured into a mixture of ice and water. The resulting milky suspension is kept at 0–5° for about 2 hours, and the resulting precipitate is collected by filtration, washed on the filter with water and dried in air. The resulting 17β-hydroxy-17α-methyl - 5α - androstano[2,3-d]-2-aminopyrimidine exhibits ultraviolet absorption maxima at about 230 and 304 millimicrons and is characterized further by the following structural formula

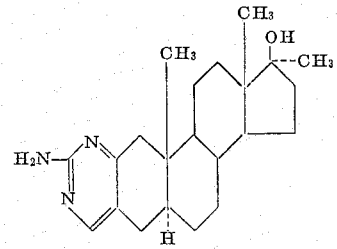

An ethereal solution of the latter amine is mixed with isopropanolic hydrogen chloride, and the resulting precipitate is collected by filtration, then washed with ether. Recrystallization from acetone produces pure 17β-hydroxy-17α-methyl - 5 - androstano[2,3-d]-2-aminopyrimidine hydrochloride.

*Example 10*

By substituting an equivalent quantity of 17α-ethyl-17β-hydroxy-5α-androstan-2-one and otherwise proceeding according to the processes described in Example 2, there is obtained 17α-ethyl-17β-hydroxy-3-hydroxymethylene-5α-androstan-2-one.

*Example 11*

The substitution of an equivalent quantity of 17α-ethyl-17β-hydroxy - 3 - hydroxymethylene-5α-androstan-2-one in the procedure of Example 9 results in 17α-ethyl-17β-hydroxy-5α-androstano[2,3-d]-2-aminopyrimidine.

What is claimed is:
1. A compound of the formula

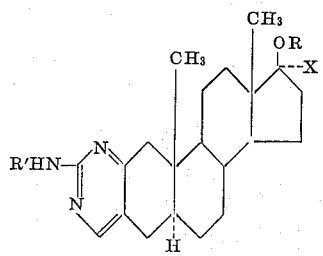

wherein R and R' are members of the class consisting of hydrogen and lower alkanoyl radicals, and X is selected from the group consisting of hydrogen and lower alkyl radicals.

2. 17β-hydroxy - 5α - androstano[2,3-d] - 2 - aminopyrimidine.

3. A compound of the formula

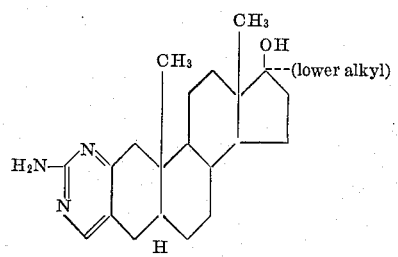

4. 17β-hydroxy-17α-methyl - 5α - androstano[2,3-d]-2-aminopyrimidine.

5. A compound of the formula

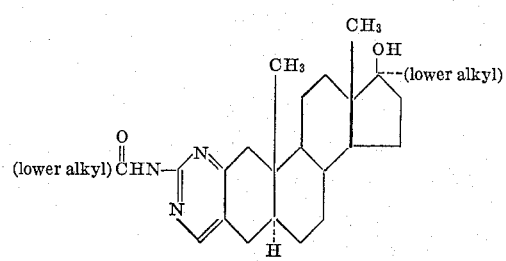

6. A compound of the formula

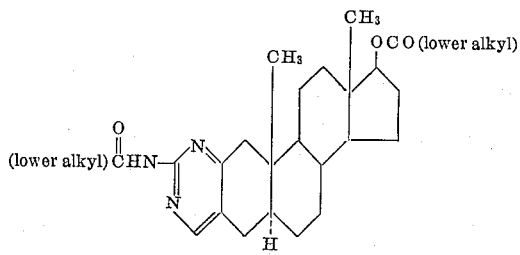

7. 17β-acetoxy - 5α - androstano[2,3-d]-2-acetamidopyrimidine.

8. A compound of the formula

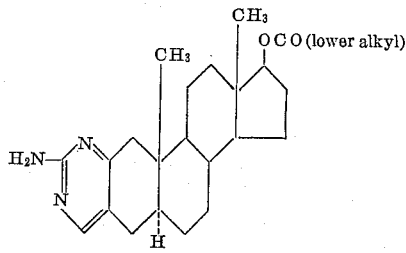

9. A compound of the formula

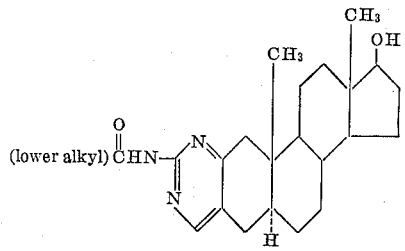

References Cited by the Examiner

UNITED STATES PATENTS 3,198,790  8/1965  Ruggieri _____ 260—239.5

OTHER REFERENCES

Smith et al.: "Journal, Medicinal Chem." (1963), volume 6, pages 330–332 relied on.

LEWIS GOTTS, *Primary Examiner.*

ELBERT L. ROBERTS, *Assistant Examiner.*